US011651550B2

(12) United States Patent
Rajagopalan et al.

(10) Patent No.: US 11,651,550 B2
(45) Date of Patent: May 16, 2023

(54) ARTIFICIAL INTELLIGENCE BASED METHODS AND SYSTEMS FOR GENERATING 3-DIMENSIONAL MODEL FROM 2-DIMENSIONAL HUMANOID SKETCHES

(71) Applicant: Treadstone Media Labs Private Limited, Thane (IN)

(72) Inventors: Karthik Rajagopalan, Chennai (IN); Mohamed Faheem Thanveer, Chennai (IN)

(73) Assignee: TREADSTONE MEDIA LABS PRIVATE LIMITED, Thane (IN)

( * ) Notice: Subject to any disclaimer, the term of this patent is extended or adjusted under 35 U.S.C. 154(b) by 90 days.

(21) Appl. No.: 17/463,684

(22) Filed: Sep. 1, 2021

(65) Prior Publication Data
US 2022/0335686 A1  Oct. 20, 2022

(30) Foreign Application Priority Data

Sep. 2, 2020  (IN) .............................. 202021037900

(51) Int. Cl.
*G06T 5/00*  (2006.01)
*G06T 11/20*  (2006.01)
(Continued)

(52) U.S. Cl.
CPC .............. *G06T 17/00* (2013.01); *G06T 15/04* (2013.01); *G06T 15/06* (2013.01); *G06T 15/08* (2013.01);
(Continued)

(58) Field of Classification Search
CPC ......... G06T 17/00; G06T 15/04; G06T 15/06; G06T 15/08; G06T 19/20; G06T 2200/24; G06T 2219/2004
See application file for complete search history.

(56) References Cited

U.S. PATENT DOCUMENTS

| 2021/0225065 A1* | 7/2021 | Holzer ................ H04N 13/282 |
| 2022/0058866 A1* | 2/2022 | Beltrand ................ G06N 3/045 |

FOREIGN PATENT DOCUMENTS

| CN | 109191559 | * | 1/2019 | ............. G06T 17/00 |
| WO | WO2021023812 | * | 2/2021 | ............. G06T 19/20 |

OTHER PUBLICATIONS

Cao et al, 3D Object Retrieval Using 2D Line Drawing and Graph Based Relevance Feedback, MM'06, Oct. 23-27, 2006 (Year: 2006).*

(Continued)

*Primary Examiner* — Phuc N Doan

(57) ABSTRACT

An application server system and a method for generating a three-Dimensional (3D) model from 2D humanoid sketches is provided. The method includes receiving, by a parameterized humanoid engine, the 2D humanoid sketches from a user device associated with a user, predicting 3D vertices that correspond to the 2D humanoid sketches based on a pose, shape, and camera orientation of a subject in the 2D humanoid sketches, plotting, using a 3D vertex plotting engine, the 3D vertices to obtain a rough 3D model, rendering the rough 3D model onto a user interface of an application server system or the user device, enabling the user to realign the rough 3D model, thereby obtaining a realigned 3D model that is accurately fit the rough 3D model to the 2D humanoid sketches, and adding textures to the realigned 3D model to generate the 3D model of the subject in the 2D humanoid sketches.

9 Claims, 6 Drawing Sheets

(51) Int. Cl.
*G06T 17/00* (2006.01)
*G06T 15/04* (2011.01)
*G06T 19/20* (2011.01)
*G06T 15/08* (2011.01)
*G06T 15/06* (2011.01)

(52) U.S. Cl.
CPC .......... *G06T 19/20* (2013.01); *G06T 2200/24* (2013.01); *G06T 2219/2004* (2013.01)

(56) References Cited

OTHER PUBLICATIONS

Akman et al, Deep generation of 3D articulated models and animations from 2D stick figures, Elsevier Computers & Graphics 109 (2022) 65-74, https://doi.org/10.1016/j.cag.2022.10.004 (Year: 2022).*
Li et al, Sketch-based 3D model retrieval by incorporating 2D-3D alignment, Multimed Tools Appl (2013) 65:363-385 DOI 10.1007/s11042-012-1009-0 (Year: 2012).*

* cited by examiner

ARTIFICIAL INTELLIGENCE BASED METHODS AND SYSTEMS FOR GENERATING 3-DIMENSIONAL MODEL FROM 2-DIMENSIONAL HUMANOID SKETCHES

CROSS-REFERENCE TO RELATED APPLICATIONS

This application claims priority to Indian non-provisional patent application no. 202021037900 filed on Sep. 2, 2020, the complete disclosure of which, in their entirety, is herein incorporated by reference.

BACKGROUND

Technical Field

The present disclosure relates generally to 3-Dimensional (3D) modeling and, more particularly, relates to artificial intelligence-based methods and systems for generating 3D models from one or more 2-Dimensional (2D) humanoid sketches.

Description of the Related Art 3D modeling is a process used for developing a mathematical and graphical 3D representation of a surface or an object either manually or using software tools. The result of the 3D modeling process is a physical 3D sculpt or a 3D model that can be rendered on to a computer screen and can be used for simulation and other animation purposes. The manual modeling of 3D objects using computer software is known as 3D sculpting.

A typical 3D sculpting is a time-consuming process and may consume, around an average of, 15-20 hours to sculpt a high-quality 3D model. An expert who is highly skilled in the art may have to perform 3D sculpting manually and create a desired 3D sculpt. Whereas, a typical automated 3D modeling technique may serve a bit less time-consuming but is an expensive process. A 3D modeler or an animator needs to first draw or download a mathematically accurate 2D sketch of a humanoid or an object that has to be rendered in a three-dimensional space. Further, the mathematically accurate 2D humanoid sketch may be fed to the desired software tool that may be programmed to generate a 3D model. Such software tools are expensive and do not output an accurate 3D model if the 2D humanoid sketch that is provided as the input to the tool is mathematically inaccurate or rudimentary. Therefore, when a 3D modeler inputs the mathematically inaccurate 2D humanoid sketches without any light source or shadows, the tool fails to generate accurate and high-quality 3D models. This makes the overall process cumbersome, expensive, and may require periodic intervention of humans, which is undesirable.

Therefore, there exists a need for technological solutions that can overcome one or more limitations stated above, in addition to providing other technical advantages.

SUMMARY

In view of the foregoing, an embodiment herein provides a system for generating a three-Dimensional (3D) model from at least one 2D humanoid sketch. The system includes a parameterized humanoid engine, a 3D vertex plotting engine and a texturizing engine. The parameterized humanoid engine receives the at least one 2D humanoid sketch from a user device associated with a user. The parameterized humanoid engine predicts 3D vertices that correspond to the at least one 2D humanoid sketch based on a pose, shape, and camera orientation of a subject in the at least one 2D humanoid sketch. The 3D vertex plotting engine is configured to plot the 3D vertices that are predicted by the parameterized humanoid engine to obtain a rough 3D model. The rough 3D model includes a pose that is similar to a pose of the subject in the at least one 2D humanoid sketch. The 3D vertex plotting engine is configured to render the rough 3D model onto a user interface of at least one of an application server system or the user device. The 3D vertex plotting engine is configured to enable the user to realign the rough 3D model, thereby obtaining a realigned 3D model that accurately fits the rough 3D model to the at least one 2D humanoid sketch. The texturizing engine includes a trained deep learning model that is configured to add textures to the realigned 3D model to generate the 3D model of the subject in the at least one 2D humanoid sketch.

In some embodiments, the parameterized humanoid engine provides a 3D base model with the predicted 3D vertices corresponding to the 2D humanoid sketch, to the 3D vertex plotting engine. In some embodiments, the 3D vertices corresponding to the at least one 2D humanoid sketch are predicted based on 2D joints of the at least one 2D humanoid sketch provided to the parameterized humanoid engine.

In some embodiments, the parameterized humanoid engine incorporates a first neural network model that includes a convolutional neural network that is trained to generate a regressed shape of the 3D base model. In some embodiments, the regressed shape of the 3D base model is fed into a second neural network model that is trained to generate an optimized skeletal point based on the shape, pose, and camera orientation of the subject of the 2D humanoid sketch.

In some embodiments, the parameterized humanoid engine is trained based on batches of the at least one 2D humanoid sketch and the 3D base model.

In some embodiments, the 3D vertex plotting engine is trained based on the at least one 2D humanoid sketch and 3D vertices of the 3D base model. In some embodiments, the 3D vertex plotting engine includes a pose prediction layer that is configured to plot the 3D vertices that are predicted by the parameterized humanoid engine.

In some embodiments, the trained deep learning model of the texturizing engine represents the 3D model as volume density and directional emitted radiance at any point in space. In some embodiments, the trained deep learning model outputs RGB (red, green, blue) colors as a 5D function of at least one of (i) a spatial position and (ii) a viewing direction.

In some embodiments, the texturizing engine renders the 3D model by estimating an integral for expected colors for a ray-traced through each pixel of the realigned 3D model.

In some embodiments, the texturizing engine estimates the integral for expected colors using a quadrant rule. In some embodiments, the texturizing engine performs hierarchical sampling on the realigned 3D model to determine that sampling is done around the realigned 3D model received from the rendering engine.

In some embodiments, the texturizing engine renders colors of any ray passing through the realigned 3D model using a classical volume rendering technique.

In one aspect, a processor-implemented method for generating a three-Dimensional (3D) model from at least one 2D humanoid sketch is provided. The processor-implemented method includes receiving, by a parameterized humanoid engine, the at least one 2D humanoid sketch from a user device associated with a user. The processor-implemented method includes predicting, by the parameterized humanoid engine, 3D vertices that correspond to the at least one 2D humanoid sketch based on a pose, shape, and camera orientation of a subject in the at least one 2D humanoid sketch. The processor-implemented method includes plotting, using a 3D vertex plotting engine, the 3D vertices that are predicted by the parameterized humanoid engine to obtain a rough 3D model. The rough 3D model includes a pose that is similar to a pose of the subject in the at least one 2D humanoid sketch. The processor-implemented method includes rendering, by the 3D vertex plotting engine, the rough 3D model onto a user interface of at least one of an application server system or the user device. The processor-implemented method includes enabling, by the 3D vertex plotting engine, the user to realign the rough 3D model, thereby obtaining a realigned 3D model that accurately fits the rough 3D model to the at least one 2D humanoid sketch. The processor-implemented method includes adding, using a trained deep learning model of a texturizing engine, textures to the realigned 3D model to generate the 3D model of the subject in the at least one 2D humanoid sketch.

The system and method generate models from 2d inaccurate drawings alone without using 3D tools to draw a 3D sketch. The system and method enable for easy accurate prototyping as well as reduce the cost and effort of 3D modelling humanoid characters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed descriptions with reference to the drawings, in which.

DETAILED DESCRIPTION OF PREFERRED EMBODIMENTS

Figure 1:
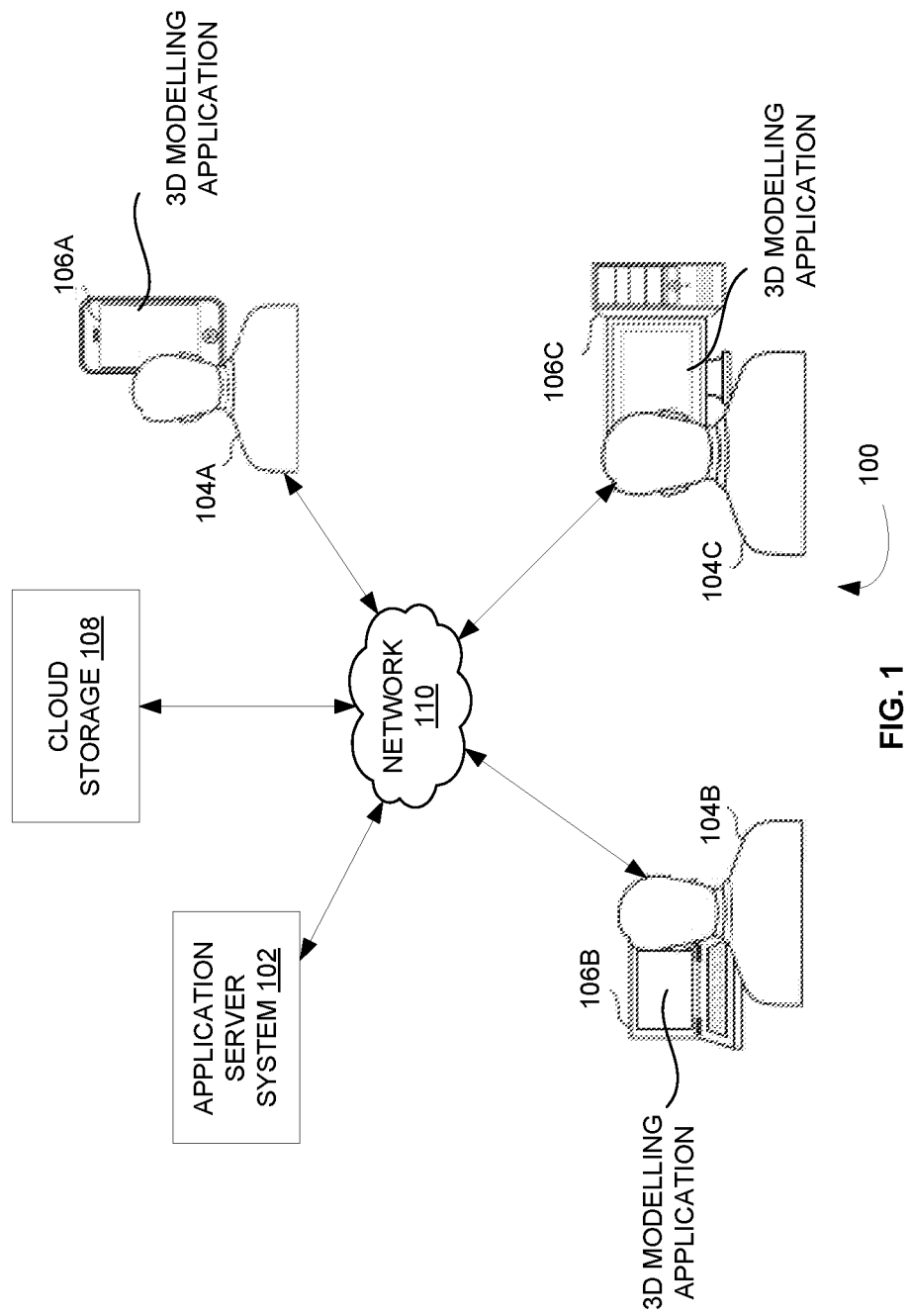
FIG. 1 is an example representation of an environment, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generating a 3D model from one or more 2D humanoid sketches. The 2D humanoid sketches may be mathematically inaccurate, or not defined with precision, and they are associated with a human face or the overall body of the human being. The present disclosure offers a 3D modeling application to the users via an application server system including various deep learning models that are trained to perform a plurality of operations. In some embodiments, the application server system adopts a three-phase approach to generate the 3D model from one or more 2D humanoid sketches. A user may access the 3D modeling application over a network, via a user device, where an admin may intervene and generate a 3D model and send the 3D model from the application server system to the user device. In some embodiments, the 3D modeling application may be completely downloaded onto the user device where the user himself can generate the 3D model using the 3D modeling application. In some embodiments, the user can access the 3D modeling application hosted in a cloud or virtual machine environment.

In some embodiments, the user may access or download the 3D modeling application and then inputs one or more 2D humanoid sketches. The application server system may receive the one or more 2D humanoid sketches and perform a 3-phase operation to obtain a final 3D model based on the one or more 2D humanoid sketches. At phase 1, the one or more 2D humanoid sketches may be fed to an engine that is trained to predict 3D vertices associated with a Skinned Multi-Person Linear (SMPL) 3D base model, based on pose, shape, and camera orientation of the one or more 2D humanoid sketches.

The SMPL model is a learned model of a human body shape and pose dependent shape variation that is more accurate and is compatible with a plurality of pipelines that are used for 3D modelling as set forth in a research paper titled "SMPL: A Skinned Multi-Person Linear Model" published by Loper, M. et al. on ACM Trans. Article No.: 248 (2015), known in the art In some embodiments, the predicted vertices of the SMPL 3D base model may then be processed at phase 2. At phase 2, the predicted 3D vertices may be provided to an engine that is configured to plot the 3D vertices to generate a rough 3D model. The plotting may be performed by a pose prediction layer. Further, the rough 3D model may be rendered onto a display screen of the application server system or the user device. A rendering engine may be configured to render the rough 3D model onto a display screen that provides a user interface including toggles, slider, and buttons that allow an admin or the user to realign/modify the rough 3D model to fit rough 3D model onto the one or more 2D humanoid sketches more accurately. The output of phase 2 may be a realigned 3D model.

The realigned 3D model may then be fed to a texturizing engine at phase 3. The texturizing engine may include a trained deep learning model that is configured to add texture and other details to the realigned 3D model to obtain a final 3D model of the human in the one or more 2D humanoid sketches. The other details may include clothes and accessories such as a shirt, a chain, a bracelet, etc.

Referring now to the drawings, and more particularly to FIGS. 1 through 5, where similar reference characters denote corresponding features consistently throughout the figures, there are shown preferred embodiments.

FIG. 1 illustrates an exemplary representation of an environment 100 according to some embodiments herein. Although the environment 100 is presented in one arrangement, other embodiments may include the parts of the environment 100 (or other parts) arranged otherwise depending on, for example, generating a 3D model of one or more 2D humanoid sketches using a 3D modeling application. The 3D modeling application may be hosted by a server system which may be a stand-alone server system or a server system embodied in cloud storage or may be incorporated in-part or as a whole in any other server system. Without loss of generality, the environment 100 includes an application server system 102, one or more users 104A-C, and one or more user devices 106A-C associated with the one or more users 104A-C respectively, and a cloud storage 108. The one or more user devices 106A-C are exemplarily shown to be displaying an interface of a 3D modeling application provided by the application server system 102.

In some embodiments, the cloud storage 108 is configured to store one or more data sets that are required to train one or more deep learning and machine learning models in the application server system 102.

The application server system 102, the one or more user devices 106A-C, and the cloud storage 108 may be in communication with each other via a network 110. In some embodiments, the network 110 is a wired network. In some embodiments, the network 110 is a wireless network. In some embodiments, the network 110 is a combination of a wired network and a wireless network. In some embodiments, the network 110 is the Internet.

The network 110 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof. Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5$^{th}$ Generation (5G) communication protocols, Long Term Evolution (LTE) communication protocols, or any combination thereof. The network 110 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 110 may include multiple different networks, such as a private network made accessible by the application server system 102, the one or more user devices 106A-C, and the cloud storage 108 separately, a public network (e.g., the Internet) through which the application server system 102 and the one or more user devices 106A-C may communicate.

The application server system 102 may be, but is not limited to, a server that hosts and maintains all the operations of a mobile application, a web application, and the like. The application server system 102 includes and/or supports various Application Programming Interfaces (APIs) that facilitate invoking of the desired application on the one or more user devices 106A-C when prompted by the one or more users 104A-C. The application server system 102 may allow the one or more users 104A-C to download and use the 3D modeling application configured to generate 3D models by inputting the one or more 2D humanoid sketches onto the one or more user devices 106A-C. In some embodiments, the 3D modeling application may be invoked by the one or more users 104A-C by selecting and opening the 3D modeling application on their respective user devices 106A-C. In an alternate embodiment, the 3D modeling application may be completely downloaded onto the one or more user devices 106A-C that may plant all the executable programs, instructions, libraries, and associated files needed to run the 3D modeling application onto the one or more user devices 106A-C.

In some embodiments, the one or more user devices 106A-C, without limitation, may be selected from a workstation, a smartphone, a tablet, a laptop, a computer system, or any computing device. The one or more users 104A-C may download the 3D modeling application through the application server system 102. The one or more users 104A-C may be required to register with the 3D modeling application for using the 3D modeling application. Once the one or more users 104A-C are registered, basic information associated with the one or more users 104A-C is collected by the 3D modeling application. The basic information includes the name of the one or more users 104A-C, a date-of-birth (DOB) of the one or more users 104A-C, email IDs of the one or more users 104A-C, and other identifiers such as SSN/PAN associated with the one or more users 104A-C, or the like. The basic information may be stored in a database that is local to the application server system 102 or the cloud storage 108. Once the one or more users 104A-C have completed the registration process, the one or more users 104A-C may be capable of logging in and utilizing the 3D modeling application to generate 3D models of humans that they desire by inputting one or more 2D humanoid sketches of the same onto the one or more user devices 106A-C via the 3D modelling application.

In some embodiments, the application server system 102 allows the one or more users 104A-C to input one or more 2D humanoid sketches and transmit those to the application server system 102 that may be a stand-alone server or a server system incorporated in the cloud storage 108. The application server system 102 is configured to generate a 3D model based on the one or more 2D humanoid sketches provided by a user such as the user 104A, by performing one or more operations including one or more phases. In some embodiments, the application server system 102 may perform a three-phase operation to generate the 3D model of the human present in the one or more 2D humanoid sketches.

In some embodiments, the 3D modeling application may be completely downloaded onto the one or more user devices 106A-C. When the 3D modeling application is completely downloaded onto the one or more user devices 106A-C, all the executable programs and trained models may be planted on to the one or more user devices 106A-C, thereby enabling the one or more user devices 106A-C to be completely independent and capable of generating the 3D models of humans based on the one or more 2D humanoid sketches provided by the one or more users 104A-C as input.

It should be noted that the arrangement of systems, devices, and/or networks shown in FIG. 1 is provided for example purposes only, and there may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
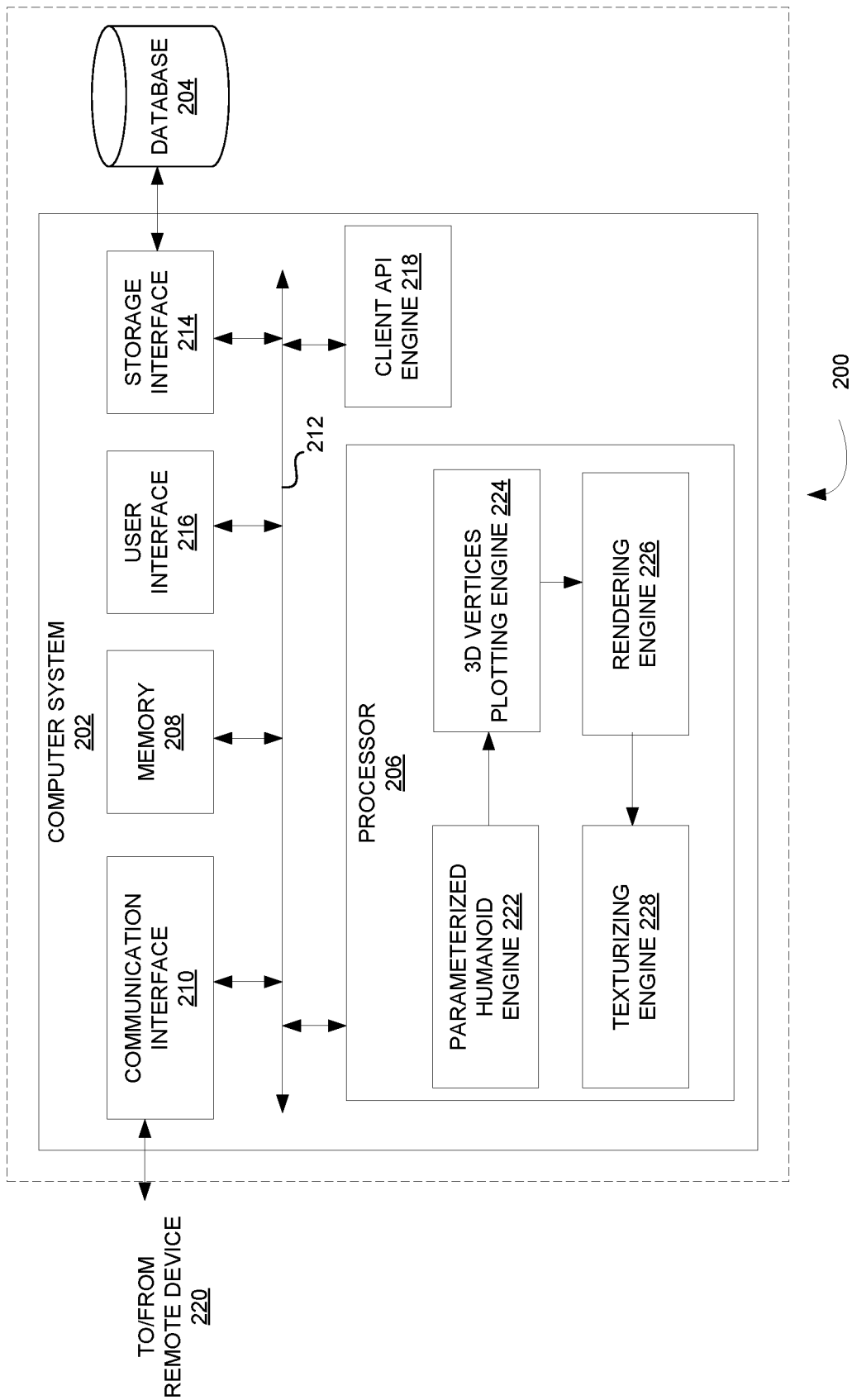
FIG. 2 is a block diagram of an application server system according to some embodiments herein.

FIG. 2 is a block diagram of an application server system 200 according to some embodiments herein. The application server system 200 is an example of the application server system 102. In some embodiments, the application server system 200 is embodied as a cloud-based and/or SaaS-based (software as a service) architecture such as in the cloud storage 108 of FIG. 1. In some embodiments, the application server system 200 may be implemented in another server system.

In some embodiments, the application server system 200 includes a computer system 202 and a database 204. The computer system 202 includes at least one processor 206 for executing instructions, a memory 208, a communication interface 210, and a client API (application program interface) engine 218. The one or more components of the computer system 202 communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In some embodiments, the database 204 is configured to store trained deep learning models (e.g., a parameterized humanoid model, rendering model, a texturizing model, etc.). In some embodiments, the database 204 may be stored in the cloud storage 108 of FIG. 1.

The processor 206 includes suitable logic, circuitry, and/or interfaces to execute operations for receiving one or more 2D humanoid sketches and generating a 3D model based on the one or more 2D humanoid sketches. The processor 206, without limitation, may be selected from, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. The memory 208, without limitation, may be selected from, a random-access memory (RAM), a read-only memory (ROM), a removable storage drive, a hard disk drive (HDD), and the like. It will be apparent to a person skilled in the art that the scope of the disclosure is not limited to realizing the memory 208 in the application server system 200, as described herein. In some embodiments, the memory 208 may be realized in the form of a database server or cloud storage 108 working in conjunction with the application server system 200, without departing from the scope of the present disclosure.

The processor 206 is operatively coupled to the communication interface 210 such that the processor 206 is capable of communicating with a remote device 220 such as the one or more user devices 106A-C or communicate with any entity connected to the network 110 (as shown in FIG. 1). Further, the processor 206 is operatively coupled to a user interface 216 for interacting with admins who may be appointed to intervene in the process of generating the 3D models and edit the rough 3D models to make them more accurate and obtain a final 3D model. In an example, the one or more users 104A-C may be facilitated to edit the 3D models on the one or more user devices 106A-C via the UI on the one or more user devices 106A-C when the 3D modeling application is completely downloaded onto the one or more user devices 106A-C.

The client API engine 218 allows the application server system 200 to invoke the 3D modeling application on the remote device 220 such as the one or more user devices 106A-C. The client API engine 218 may include the suitable logic, circuitry, and/or interfaces to invoke the 3D modeling application onto the remote device 220 when a request to open the 3D modeling application on the remote device 220 is received from the remote device 220.

It is noted that the application server system 200 as illustrated and hereinafter described is merely illustrative of an apparatus that could benefit from embodiments of the present disclosure and, therefore, should not be taken to limit the scope of the present disclosure. It is noted that the application server system 200 may include fewer or more components than those depicted in FIG. 2.

In some embodiments, the processor 206 includes a parameterized humanoid engine 222, a 3D vertices plotting engine 224, a rendering engine 226, and a texturizing engine 228. It should be noted that the components, described herein, can be configured in a variety of ways, including electronic circuitries, digital arithmetic and logic blocks, and memory systems in combination with software, firmware, and embedded technologies.

In some embodiments, the parameterized humanoid engine 222 includes suitable logic and/or interfaces for predicting 3D vertices of a SMPL 3D base model, for the one or more 2D humanoid sketches of a human, received by the application server system 200, from a user device such as the user device 106A. Without limiting to the scope of the present disclosure, in an example, the parameterized humanoid engine 222 may include a SMPL oPtimization IN the loop (SPIN) model. It should be noted that although references of SPIN model are used in the present description for example purposes only, and the parameterized humanoid engine 222 may include any other model to carry out the functionalities disclosed herein. The parameterized humanoid engine 222 is trained based on batches of one or more 2D humanoid sketches and the SMPL 3D base model. The SMPL 3D base model is a generic 3D model of a human that is available in the art. The parameterized humanoid engine 222 may incorporate a neural network model that includes a convolutional neural network that is trained to generate a regressed shape of the SMPL 3D base model. Further, the regressed shape of the SMPL 3D base model is fed into another neural network model that is trained to generate optimized skeletal points based on the shape, pose, and camera orientation of the one or more 2D humanoid sketches. The 3D vertices of the SMPL 3D base model are predicted based on 2D joints and key points such as the pose, shape and camera orientation of the one or more 2D humanoid sketches provided to the parameterized humanoid engine 222.

The SPIN model is a self-improving approach for training a neural network for 3D human pose and shape estimation through the tight collaboration of regression and an optimization method as set forth in a research paper titled "Learning to Reconstruct 3D Human Pose and Shape via Model-Fitting in the Loop", published in 2019, IEEE/CVF International Conference on Computer Vision (ICCV), as known in the art.

Further, the output from the parameterized humanoid engine 222 may be provided to the 3D vertices plotting engine 224. The 3D vertices plotting engine 224 includes a pose prediction layer that is trained to plot the 3D vertices that are predicted by the parameterized humanoid engine 222. The 3D vertices plotting engine 224 may be trained based on the 2D humanoid sketches and 3D vertices of the SMPL 3D base model to plot the 3D vertices and generate a rough 3D model including a pose similar to the pose of the human in the one or more 2D humanoid sketches. The output of the 3D vertices plotting engine 224 is a rough 3D model of the human.

Further, the 3D modeling application facilitates a user interface 216 to the one or more users 104A-C or an admin who may be at the application server system 200 who is appointed to fit the rough 3D model of the human to the one or more 2D humanoid sketches accurately. The rendering engine 226 is configured to render the rough 3D model onto the user interface 216 of the one or more user devices 106A-C or the user interface 216 of the application server system 200. The rendering engine 226 is also configured to provide toggles, buttons, and sliders on the user interface 216 to the admin for fitting the rough 3D model to the one or more 2D humanoid sketches more accurately. In some embodiments, the 2D humanoid sketch that is input by the user (e.g., the user 104A) may be displayed in the background and the rough 3D model may be rendered onto the user interface 216 so as to look superimposed on the 2D humanoid sketch. The rough 3D model may be displayed on top and can be modified to fit the rough 3D model to the 2D humanoid sketch, using the various toggles, sliders, and buttons provided on the user interface 216.

In some embodiments, where the user (e.g., the user 104A) is using an online service of the 3D modeling application, the rough 3D model may be rendered onto the user interface 216 of the application server system 200. An admin may be appointed to perform the fitting operation. In some embodiments, when the user has downloaded the 3D modeling application onto the user device completely and the 3D modeling application can be independently run on the user device, the rough 3D model may be rendered onto the user interface 216 of the user device providing toggles, buttons, and sliders to the user facilitating the user to realign the rough 3D model. The user or the admin may then press a 'Finish' button to complete the fitting process and progress to the next step. The output obtained after realigning the rough 3D model may be a realigned 3D model. The next step includes adding texture and other details such as clothes and accessories to the realigned 3D model via the texturizing engine 228.

The texturizing engine 228 is fed with the realigned 3D model that is output from the rendering engine 226 after the user or the admin has modified/realigned it. In some embodiments, the one or more 2D humanoid sketches that were input to the parameterized humanoid engine 222 may also be fed to the texturizing engine 228 for obtaining better accuracy in the generation of a final 3D model. Both the realigned 3D model and the one or more 2D humanoid sketches are fed to the texturizing engine 228 to add texture and other details to the realigned 3D model to finally render a more accurate and high-quality, final 3D model (mesh) of the human.

The texturizing engine 228 includes a trained deep learning model that represents a 3D model as the volume density and directional emitted radiance at any point in space. The trained deep learning model outputs RGB (red, green, blue) colors as a 5D function of both spatial position and viewing direction. The texturizing engine 228 renders the colors of any ray passing through the realigned 3D model using principles from classical volume rendering. The volume density can be interpreted as the differential probability of a ray terminating at an infinitesimal particle at any given location in the realigned 3D model. In some example embodiments and without limiting the scope of the present disclosure, the trained deep learning model may be trained based on a 5-dimensional (5D) neural radiancefield (NeRF).

Further, rendering a final 3D model, by the texturizing engine 228 includes estimating the integral for expected colors for a ray-traced through each pixel of the realigned 3D model. The integral for the expected colors may be estimated in two ways.

In some embodiments, the realigned 3D model that is output by the rendering engine 226 is provided as a shape prior to the texturizing engine 228. The texturizing engine 228 is configured to estimate the integral by using a quadrant rule and performing hierarchical sampling on the realigned 3D model to ensure that sampling is done around the realigned 3D model that is output by the rendering engine 226. The process of hierarchical sampling results in a final 3D model including texture and other details such as clothes and accessories.

In some embodiments, the triangles from the realigned 3D model output by the rendering engine 226 are taken as input and the triangles are converted into a triangle soup forming clear and accurate textures. Further, the implicit volume representation of the triangle soup is determined by using a signed distance function. The implicit volume representation of the triangle soup is then passed through the trained deep learning model to generate a final 3D model with textures and other details. In some embodiments, the 2D humanoid sketch may also be fed as input to the texturizing engine 228 along with the realigned 3D model to increase the accuracy and to generate higher quality final 3D models.

The NeRF is a method that optimizes a continuous 5D neural radiance field representation (volume density and view-dependent color at any continuous location) of a scene from a set of input images. Techniques from volume rendering to accumulate samples of the scene representation along rays to render the scene from any viewpoint are used as set forth in publication 'arXiv:2003.08934', as known in the art.

The final 3D model generated by the texturizing engine 228 may then be rendered onto the user device such as the user device 106A, by the application server system 200. In some embodiments, where the 3D modeling application is downloaded onto the one or more user devices 106A-C and can be independently operated without the intervention of the application server system 200, the 3D modeling application in the user device 106A may generate and render the final 3D model onto the displaying screen of the user device such as the user device 106A.

Figure 3A:
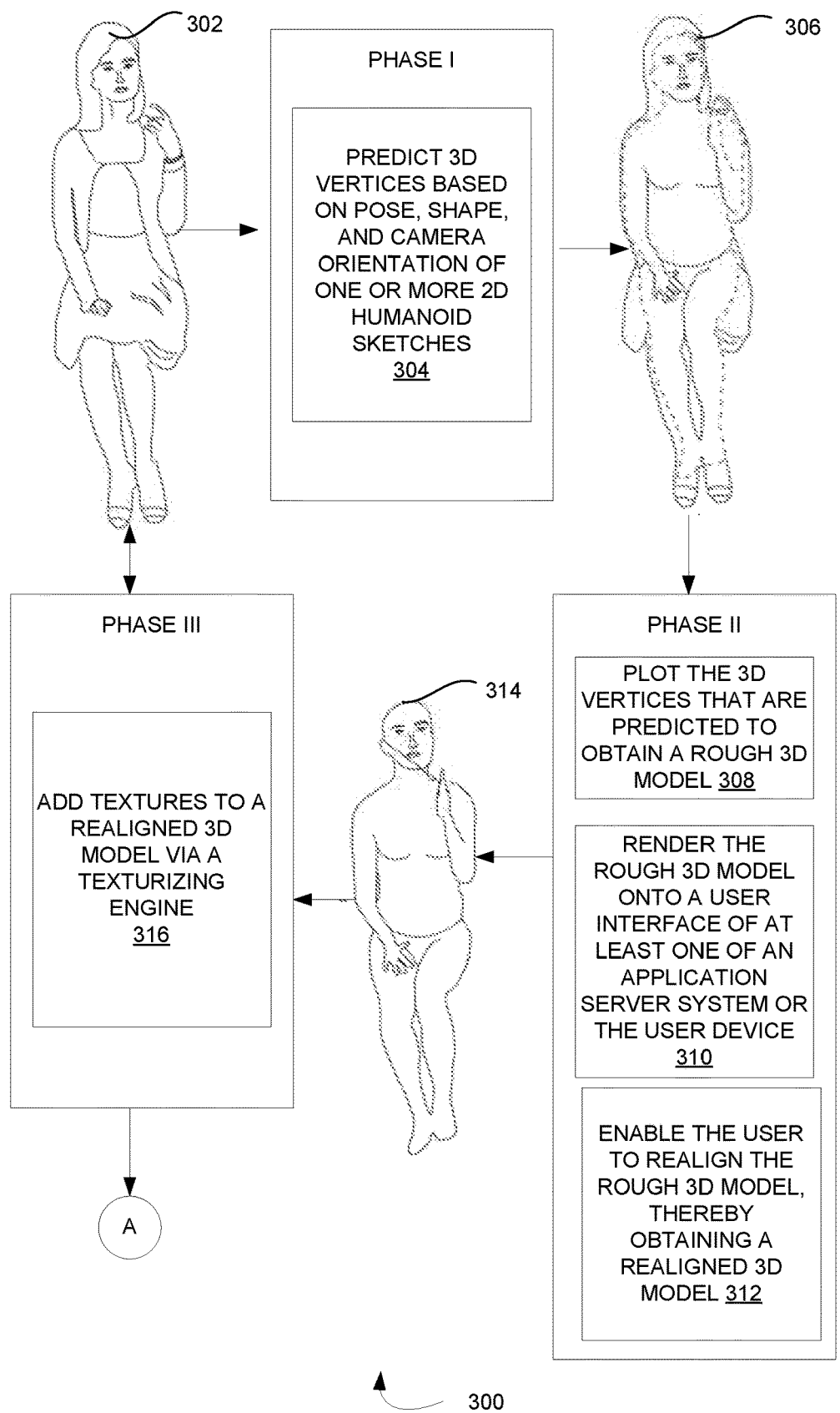
FIGS. 3A and 3B are example representations for generating a 3D model from one or more 2D humanoid sketches via an application according to some embodiments herein.
Figure 3B:
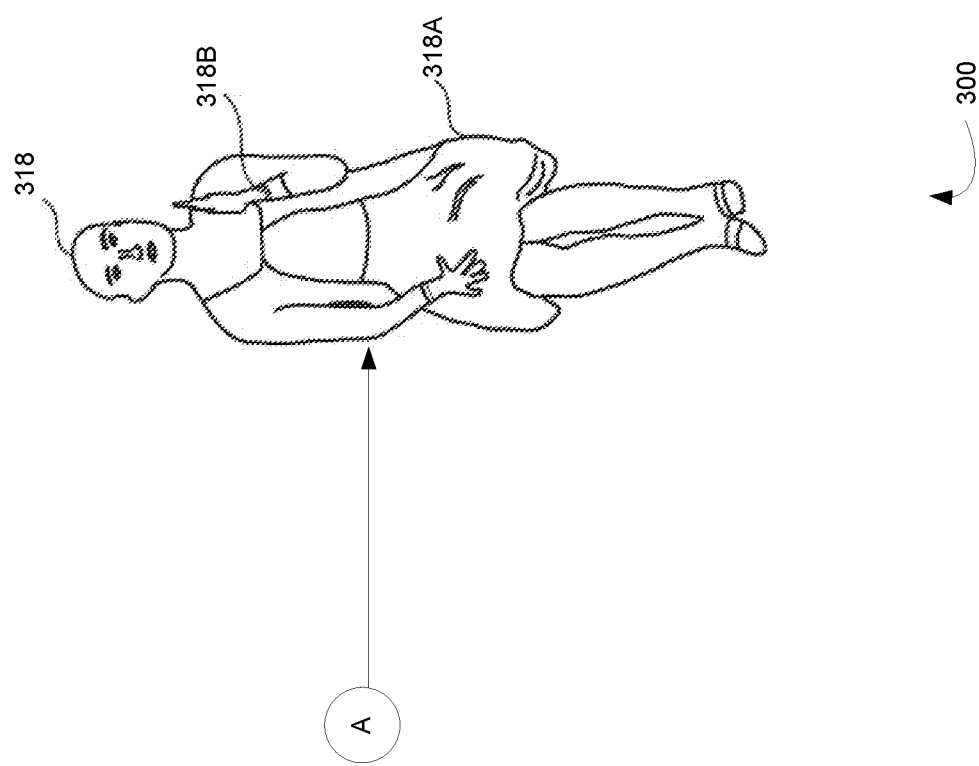

FIGS. 3A and 3B illustrate example representations 300 for generating a 3D model from one or more 2D humanoid sketches using a three-phase approach, according to some embodiments herein. In some embodiments, a 2D humanoid sketch 302 is input by a user such as the user 104A using the 3D modeling application on the user device 106A. The 2D humanoid sketch 302 may be mathematically inaccurate without any light source and shadows defining the accuracy of the human figure on the 2D humanoid sketch 302. At phase 1, the 2D humanoid sketch 302 may be passed through a parameterized humanoid engine 222. At 304, the process includes predicting 3D vertices based on the pose, shape, and camera orientation of a subject in the one or more sketches provided as the input. The subject may include one or more persons, pets, props, etc. In the example, as a single 2D humanoid sketch 302 is provided as an input, the 3D vertices related to the input are predicted by the parameterized humanoid engine 222 as explained in FIG. 2.

An output 306 of phase 1 may be a SMPL 3D base model with the predicted vertices related to the 2D humanoid sketch 302. The output 306 may then be fed as input to the next phase, i.e., phase 2. Phase 2 includes a 3D vertices plotting engine 224 and a rendering engine 226. The 3D vertices plotting engine 224 includes a pose prediction layer that is configured to plot the predicted 3D vertices that are predicted at 304. At 308, the process includes plotting the 3D vertices that are predicted to obtain a rough 3D model. At 310, the process includes, rendering the rough 3D model onto the user interface 216 of the application server system 200 or the user device 106A. The rough 3D model may be rendered onto a display screen via a user interface such as the user interface 216 of the application server system 200, by the rendering engine 226. At 312, the process includes facilitating an admin to modify/realign the rough 3D model to accurately fit the rough 3D model to the 2D humanoid sketch 302. The admin may be facilitated with toggles, sliders, and buttons on the user interface 216, allowing the admin to modify the rough 3D model to fit the 2D humanoid sketch 302 more accurately.

An output of phase 2 may be a realigned 3D model 314. The realigned 3D model 314 may not include textures and other details such as clothes and accessories that may be required to provide an accurate and high-quality final 3D model. Therefore at 316, the process includes adding textures to the realigned 3D model 314 via a texturizing engine 228. The texturizing engine 228 includes a trained deep learning model that is configured to add textures and other details to the realigned 3D model 314. In one embodiment, the 2D humanoid sketch 302 may also be fed to the texturizing engine 228 of phase 3 for adding textures and other details such as clothes, accessories, etc., to the 3D model. The output of phase 3 is a final 3D model 318. The final 3D model is shown to exemplarily include a shirt 318A and a bracelet 318B.

Figure 4:
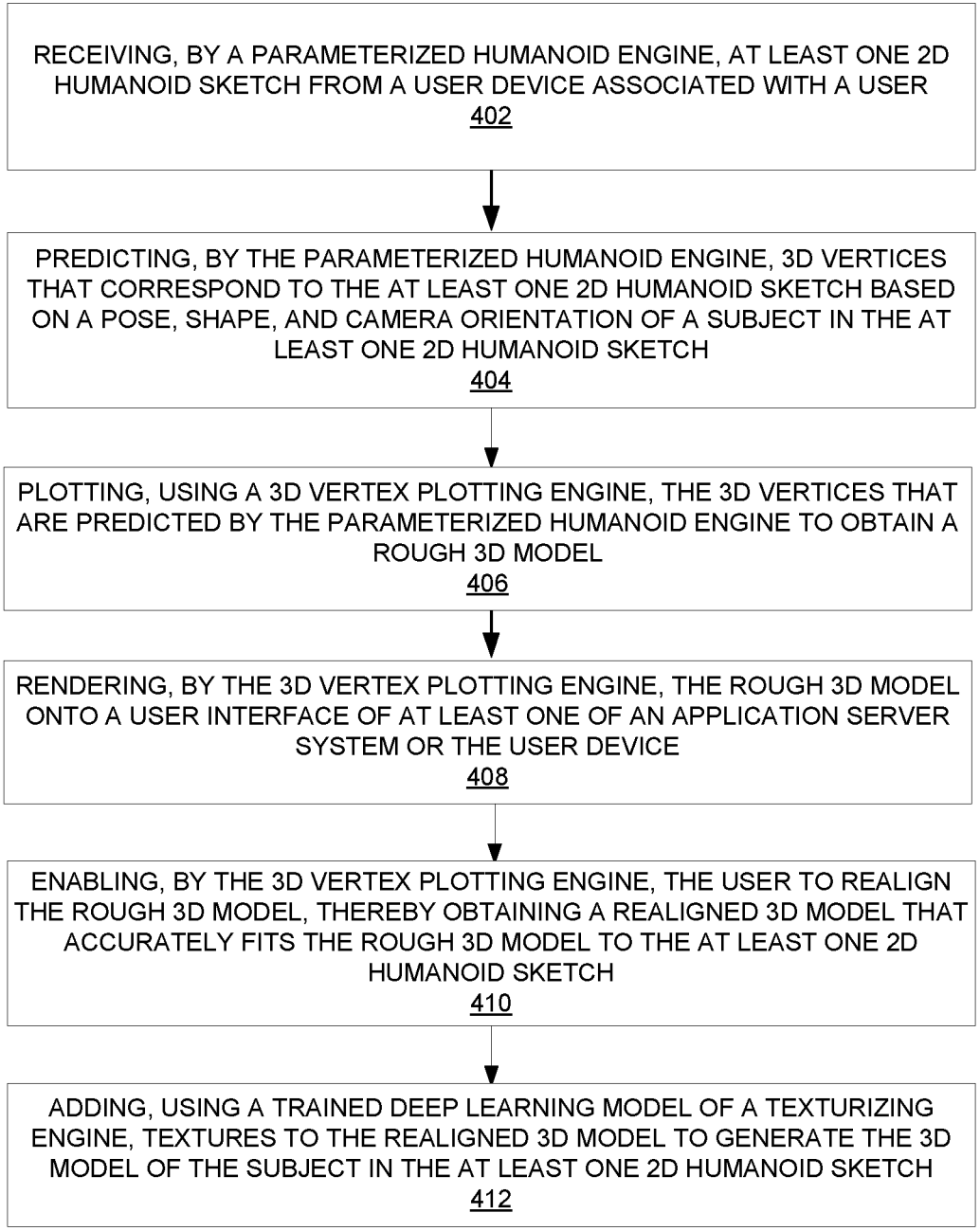
FIG. 4 is a flow diagram that illustrates a processor-implemented method for generating a three-Dimensional (3D) model from one or more 2D humanoid sketches according to some embodiment herein.

FIG. 4 is a flow diagram that illustrates a processor-implemented method 400 for generating a three-Dimensional (3D) model from one or more 2D humanoid sketches according to some embodiment herein. At a step 402, the one or more 2D humanoid sketches are received from a user device associated with a user by the parameterized humanoid engine 222. At a step 404, 3D vertices that correspond to the one or more 2D humanoid sketches are predicted, by the parameterized humanoid engine 222, based on a pose, shape, and camera orientation of a subject in the one or more 2D humanoid sketches. At a step 406, the 3D vertices that are predicted by the parameterized humanoid engine 222 are plotted, using the 3D vertex plotting engine 224, to obtain a rough 3D model. The rough 3D model includes a pose that is similar to a pose of the subject in the one or more 2D humanoid sketches. At a step 408, the rough 3D model is rendered, by the 3D vertex plotting engine 224, onto a user interface of at least one of an application server system or the user device. At a step 410, the user is enabled to realign the rough 3D model, by the 3D vertex plotting engine 224, thereby obtaining the realigned 3D model 314 that accurately fits the rough 3D model to the one or more 2D humanoid sketches. At a step 412, textures are added to the realigned 3D model 314 to generate the 3D model of the subject in the one or more 2D humanoid sketches using a trained deep learning model of the texturizing engine 228.

Although the present disclosure has been explained with the humanoid objects, it should be noted that the teachings of the present disclosure can be applied on any other type of living or non-living objects.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
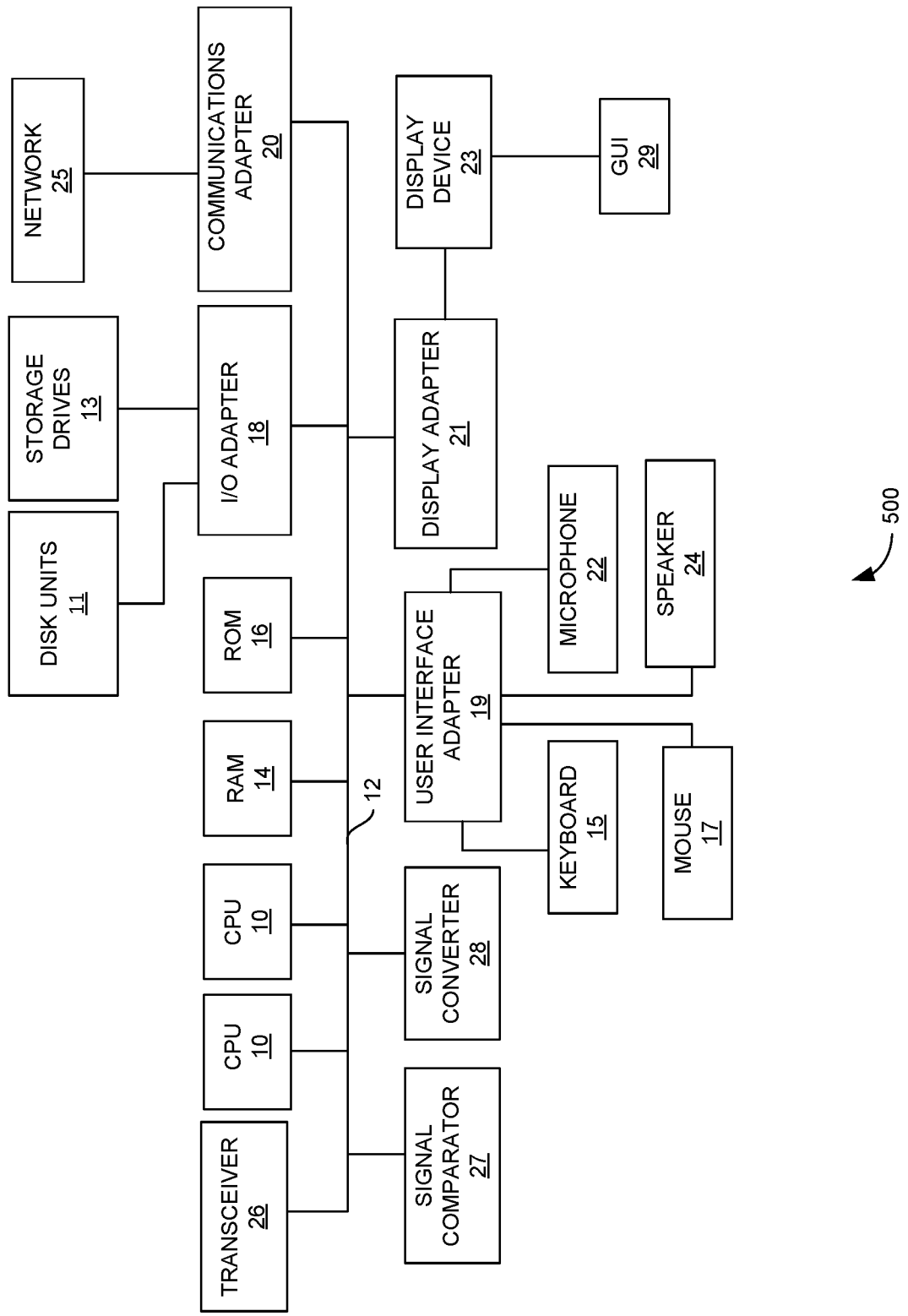
FIG. 5 is a schematic diagram of a computer architecture in accordance with the embodiments herein.

A representative hardware environment for practicing the embodiments herein is depicted in FIG. 5, with reference to FIGS. 1 through 4. This schematic drawing 500 illustrates a hardware configuration of a server/computer system/user device in accordance with the embodiments herein. The user device includes at least one processing device 10. The special-purpose CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The user device can read the inventive instructions on the program storage devices and follow these instructions to execute the methodology of the embodiments herein. The user device further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of employed herein is for the purpose of description and not of limitation. Therefore, while the embodiments herein have been described in terms of preferred embodiments, those skilled in the art will recognize that the embodiments herein can be practiced with modification within the sprit and scope of the appended claims.

What is claimed is:

1. An application server system for generating a three-Dimensional (3D) model from at least one 2D humanoid sketch, comprising:
    a processor that comprises:
        a parameterized humanoid engine that:
            receives the at least one 2D humanoid sketch from a user device associated with a user;
            predicts 3D vertices that correspond to the at least one 2D humanoid sketch based on a pose, shape, and camera orientation of a subject in the at least one 2D humanoid sketch; and
            provides a 3D base model with the predicted 3D vertices corresponding to the 2D humanoid sketch, to the 3D vertex plotting engine, wherein the 3D vertices corresponding to the at least one 2D humanoid sketch are predicted based on 2D joints of the at least one 2D humanoid sketch provided to the parameterized humanoid engine;
        a 3D vertex plotting engine that is configured to:
            plot the 3D vertices that are predicted by the parameterized humanoid engine to obtain a rough 3D model, wherein the rough 3D model comprises a pose that is similar to a pose of the subject in the at least one 2D humanoid sketch;
            render the rough 3D model onto a user interface of at least one of an application server system or the user device; and
            enable the user to realign the rough 3D model, thereby obtaining a realigned 3D model that accurately fits the rough 3D model to the at least one 2D humanoid sketch; and
        a texturizing engine that comprises a trained deep learning model that is configured to add textures to the realigned 3D model to generate the 3D model of the subject in the at least one 2D humanoid sketch.

2. The application server system of claim 1, wherein the parameterized humanoid engine incorporates a first neural network model that comprises a convolutional neural network that is trained to generate a regressed shape of the 3D base model, wherein the regressed shape of the 3D base model is fed into a second neural network model that is trained to generate an optimized skeletal point based on the shape, pose, and camera orientation of the subject of the 2D humanoid sketch.

3. The application server system of claim 1, wherein the parameterized humanoid engine is trained based on batches of the at least one 2D humanoid sketch and the 3D base model.

4. The application server system as claimed in claim 1, wherein the 3D vertex plotting engine is trained based on the at least one 2D humanoid sketch and 3D vertices of the 3D base model, wherein the 3D vertex plotting engine comprises a pose prediction layer that is configured to plot the 3D vertices that are predicted by the parameterized humanoid engine.

5. The application server system of claim 1, wherein the trained deep learning model of the texturizing engine represents the 3D model as volume density and directional emitted radiance at any point in space, wherein the trained deep learning model outputs RGB (red, green, blue) colors as a 5D function of at least one of (i) a spatial position and (ii) a viewing direction.

6. The application server system of claim 1, wherein the texturizing engine renders the 3D model by estimating an integral for expected colors for a ray traced through each pixel of the realigned 3D model.

7. The application server system of claim 6, wherein the texturizing engine estimates the integral for expected colors using a quadrant rule, wherein the texturizing engine performs hierarchical sampling on the realigned 3D model to determine that sampling is done around the realigned 3D model received from the rendering engine.

8. The application server system of claim 6, wherein the texturizing engine renders colors of any ray passing through the realigned 3D model using a classical volume rendering technique.

9. A processor-implemented method for generating a three-Dimensional (3D) model from at least one 2D humanoid sketch, comprising:
    receiving, by a parameterized humanoid engine, the at least one 2D humanoid sketch from a user device associated with a user;
    predicting, by the parameterized humanoid engine, 3D vertices that correspond to the at least one 2D humanoid sketch based on a pose, shape, and camera orientation of a subject in the at least one 2D humanoid sketch;
    providing, by the parameterized humanoid engine, a 3D base model with the predicted 3D vertices corresponding to the 2D humanoid sketch, to the 3D vertex plotting engine, wherein the 3D vertices corresponding to the at least one 2D humanoid sketch are predicted based on 2D joints of the at least one 2D humanoid sketch provided to the parameterized humanoid engine;

plotting, using a 3D vertex plotting engine, the 3D vertices that are predicted by the parameterized humanoid engine to obtain a rough 3D model, wherein the rough 3D model comprises a pose that is similar to a pose of the subject in the at least one 2D humanoid sketch;
rendering, by the 3D vertex plotting engine, the rough 3D model onto a user interface of at least one of an application server system or the user device;
enabling, by the 3D vertex plotting engine, the user to realign the rough 3D model, thereby obtaining a realigned 3D model that accurately fits the rough 3D model to the at least one 2D humanoid sketch; and
adding, using a trained deep learning model of a texturizing engine, textures to the realigned 3D model to generate the 3D model of the subject in the at least one 2D humanoid sketch.

* * * * *